UNITED STATES PATENT OFFICE.

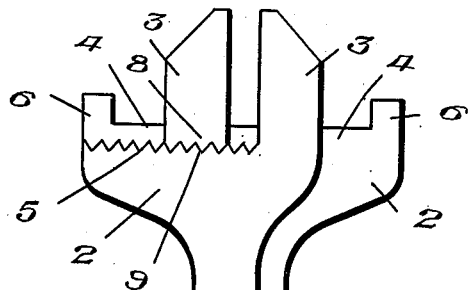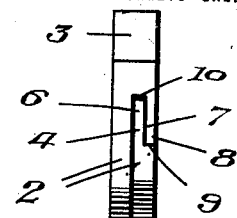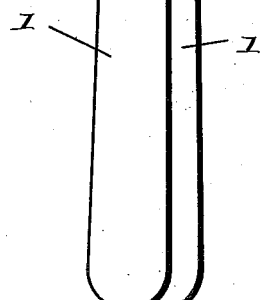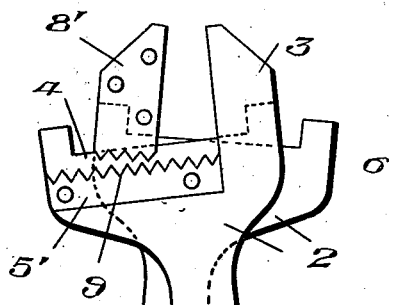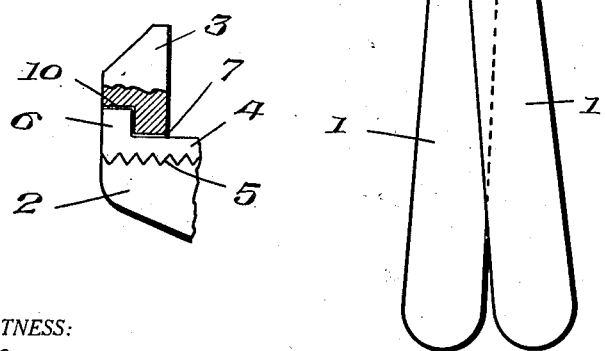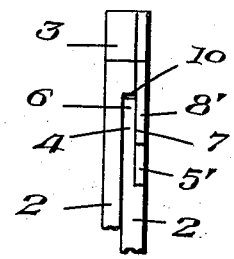

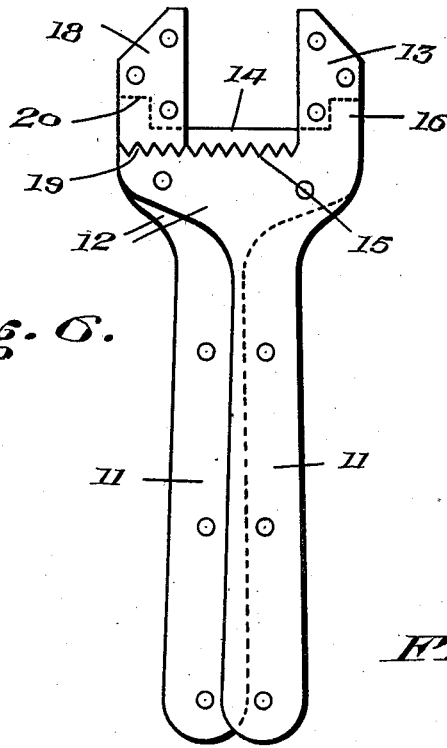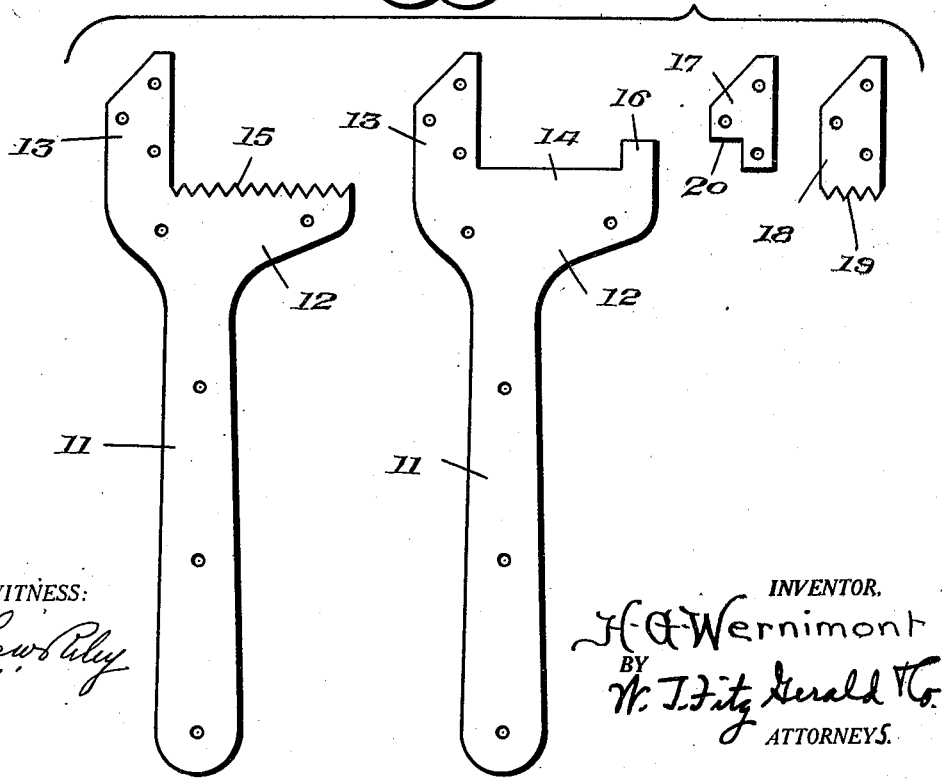

HENRY G. WERNIMONT, OF WASHINGTON, DISTRICT OF COLUMBIA.

WRENCH.

1,370,175.  Specification of Letters Patent.  Patented Mar. 1, 1921.

Application filed January 16, 1919. Serial No. 271,390.

*To all whom it may concern:*

Be it known that I, HENRY G. WERNIMONT, a citizen of the United States, residing at Washington, District of Columbia, have invented certain new and useful Improvements in Wrenches; and I do hereby declare the following to be a full, clear, and exact description of the invention, such as will enable others skilled in the art to which it appertains to make and use the same.

The present invention relates to wrenches, such as are commonly called monkey wrenches, and it is the object of the invention to provide an implement or tool of that nature of extremely simple construction, which can be manufactured at small cost, which consist of but two parts and which can be quickly adjusted to different sizes in a convenient manner.

A further object is the provision of such a wrench, the parts of which are duplicates of one another for mutual engagement with one another, so that the cost of manufacture is reduced to a minimum, and it simply being necessary to produce the one part in quantities, and assemble two of them to complete the wrench, the construction being such that the two parts can be quickly assembled and adjusted for different sizes of nuts or other objects.

A still further object is the provision of the wrench having the characteristics above mentioned, the parts of which can be readily cast from suitable metal, manufactured from sheet metal, or otherwise made.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a side elevation of a wrench constructed in accordance with the present invention, the parts thereof being of cast metal.

Fig. 2 is a fragmentary view illustrating the means for limiting the separation of the jaws.

Fig. 3 is an edge view of the wrench.

Fig. 4 is an elevation of a second form of the invention, the parts being castings, with the toothed portions of sheet metal or other separate pieces, instead of being integral as shown in Fig. 1.

Fig. 5 is an edge view of the form shown in Fig. 4, portions being broken away.

Fig. 6 is an elevation of still another form of the wrench constructed entirely of sheet metal.

Fig. 7 is a plan view of the sheet metal clampings constituting one part of the sheet metal wrench, the stampings being laid side by side.

The wrench shown in Figs. 1, 2 and 3, comprises two cast metal parts, which are duplicates of one another in reversed positions, so that it will be understood that it is only necessary to manufacture the one part in quantities, and to assemble two of them. Although the parts can be cast, it will be evident that they can be forced or otherwise made. Each part or section of the wrench comprises a handle or lever 1 having at its outer end a T-head 2 provided at one end with an outstanding jaw 3, said handle, head and jaw being flat and in a common plane. The outer edge of the head 2 is rabbeted at one side, from the jaw 3 to the opposite end of the head, to provide a lip or portion 4 of reduced thickness, and a shoulder which is serrated or toothed, as at 5. The lip 4 is provided at that end opposite to the jaw 3 with an outstanding lug 6 for limiting the separation of the two jaws, as will hereinafter more fully appear.

The two parts of the wrench are disposed in an overlapping relation with the lips 4 disposed side by side, and the teeth 5 at the opposite sides, the two parts being in reversed positions. The jaws 3 are thicker than the handles 1 and heads 2, so as to overhang or extend across the lips 4 of the opposite parts, and the inner ends of the jaws 3 have transverse grooves or channels 7 receiving the lips 4 of the opposite parts, and providing lips 8 overlapping the lips 4 of the opposite parts at those sides thereof opposite to the respective heads 2. Thus, the head 2 and lip 8 of each part straddle or fit slidably over the lip or flange 4 of the opposite part, when the two parts are assembled, and such assembling can be readily accomplished in an instant by moving the handles 1 into overlapping relation longitudinally with a swinging movement as suggested in Fig. 4, the handle 1 being so positioned that the jaws 3 and flanges or lips 4 come together as the handles are swung together in overlapping relation. The lip 8 of each part is serrated or toothed, as at 9, to interengage with the teeth 5, and each jaw 3 has a recess 10 extending outwardly from the groove or channel 7 to receive the lug 6 of the opposite part, as seen in Fig. 2.

When the two parts have been assembled, and the handles 1 swung toward one another, the jaws 3 in bearing against the flanges or lips 4 will cause the heads 2 to be swung into alinement with the teeth 5 and 8 of the opposite parts interengaging to lock the jaws 3 in their adjusted position. This prevents longitudinal movement of the jaws 3 as long as the handles are held together, as when grasped by the hand. To change the adjustment, when the handles 1 are released and swung apart, this separates the teeth, as seen in Fig. 4, and it is an easy matter to slide the parts to either separate the jaws or move them closer together as desired, and when the handles are again swung toward one another, the jaws will be locked in their desired position. Adjustments are thus made conveniently and almost instantaneously, and the parts are also quickly assembled and separated, the wrench being complete with simply the use of two duplicate parts. The lugs 6 limit the separation of the jaws, since it will be noted that when the jaws are separated to the limit permitted, the lugs 6 in entering the recesses 10 will prevent further separation of the jaws. When assembled, the two parts are held together by reason of the fact that the lips 8 overlap the flanges or lips 4 and only by swinging the handles 1 apart and then properly manipulating them, are the parts separated.

The construction shown in Figs. 4 and 5 is about the same with the exception that the heads 2 and jaws 3 have sheet metal or similar pieces 5′ and 8′ respectively, riveted thereto and provided with the teeth. Pieces 5′ are embedded in the opposite sides of the heads 2 flush therewith, with the toothed or serrated edges spaced from the edges or lips 4, and the pieces 8′ are secured to the jaws 3 and project inwardly to overlap the lips 4 and engage the pieces 5′. By using the pieces 5′ and 8′ this facilitates casting or forging the main parts of the wrench, and the toothed portions can be readily stamped from sheet metal and riveted or otherwise secured to the cast or forged parts.

The modification shown in Figs. 6 and 7 is constructed entirely of sheet metal, the completed construction of each part being substantially the same as those shown in Figs. 1 and 4, the two parts being duplicates and being assembled and adjusted in the same way. Each part is composed of four superposed sheet metal stampings, as shown in Fig. 7. Two of these stampings have the handle portions 11 and the head portions 12 which are superposed and riveted together to provide the handle and head, and the portions 12 are each provided at one end with an outstanding jaw portion 15, which are also superposed and riveted together to provide the jaw. The outer edge of one portion 12 extends outwardly farther than the other edge of the other portion 12, to provide the lip 14 which is provided at that end opposite to the respective portion 13 with the outstanding lug 16. The outer edge of the other portion 12 is serrated or toothed as at 15, so that when the two large stampings are secured together, the lip 14 will project beyond the teeth 15. A sheet metal piece 17 is then disposed on the respective portion 13, and a sheet metal piece 18 disposed on the piece 17, thus completing the jaw, the parts of which are riveted or otherwise secured together. The piece 18 is longer than the piece 17, and its inner end is serrated or toothed as at 19, to overlap the lip 14 of the opposite jaw, as will be understood from the foregoing, and the piece 17 has the recess 20 to receive the lug 16 of the opposite part. Thus, referring to Fig. 7, the second stamping is placed on the first one, the third, piece 17, is placed on the second stamping, and the fourth, piece 18, is placed on the third one, and the parts riveted are otherwise secured together, providing a construction substantially the same as each of the parts shown in Figs. 1 and 4, but the parts of the wrench shown in Fig. 6 can thus be readily stamped from sheet metal when this is preferred.

Having thus described the invention, what is claimed as new is:—

1. A wrench comprising two duplicate parts each having a handle, a head and a jaw outstanding from the head, said heads being adapted to overlap, and the heads and jaws of the opposite parts having similar reversed portions to mutually interengage and lock them together when the handles are swung toward one another.

2. A wrench comprising two duplicate parts, each having a handle, a head and a jaw outstanding from the head, the heads being adapted to overlap, and the jaws having similar means for mutually engaging over the edges of the heads, when the handles are swung toward one another, so as to lock the parts together.

3. A wrench comprising two duplicate parts, each having a handle, a head and a jaw outstanding from the head, the heads being adapted to overlap, and the jaws to extend across the outer edges of the opposite heads, said jaws having similar grooves for mutually receiving the outer edges of the opposite heads when the handles are swung toward one another.

4. A wrench comprising two duplicate parts, each having a handle, a head and a jaw outstanding from the head, the jaws and outer edges of the heads having portions to fit together mutually and hold the parts in overlapping relation, and said heads and jaws having interengageable toothed portions to interengage mutually when the handles are swung toward one another.

5. A wrench comprising two duplicate parts, each having a handle, a head and a jaw outstanding from the head, the heads being adapted to overlap and the jaws to extend across the edges of the opposite heads, said jaws having similar grooves for mutually receiving the outer edges of the opposite heads, and the heads having outstanding lugs at those ends opposite the respective jaws, to contact with the jaws of the opposite parts for limiting the separation thereof.

6. A wrench comprising two duplicate parts, each having a handle, a head, and a jaw outstanding from the head at one end thereof, each head having a lip at its outer edge and an outsanding lug at that end opposite to the jaw, said heads being adapted to overlap and the jaws to extend across the lips of the opposite heads, the inner ends of the jaws having similar grooves for mutually receiving said lips of the opposite heads, and providing portions to overlap said lips and provided with teeth, the opposite sides of the heads having teeth to mutually interengage with the aforesaid teeth in different longitudinal positions of said heads.

7. A wrench comprising two parts which can be readily separated and assembled and each having a handle, a head and a jaw outstanding from the head, said heads being adapted to be brought together in overlapping relation and to be separated, said parts having means to interengage when said handles are swung toward one another and arranged to prevent the separation of said heads when the handles are swung toward one another, and to disengage said parts when the handles are swung apart so that the parts can be separated, and said parts having interengageable means for holding the jaws at different distances apart when the handles are swung toward one another.

8. A wrench comprising two duplicate parts, each having a handle, a head, and a jaw outstanding from the head, means to hold said parts in associated relation, and said heads and jaws having interengageable toothed portions to interengage mutually when the handles are swung toward one another.

In testimony whereof I have signed my name to this specification.

HENRY G. WERNIMONT.